Oct. 28, 1952  A. B. MACHADO  2,615,632
DECIMAL POINT INDICATOR FOR CALCULATING MACHINES
Filed March 15, 1949  3 Sheets-Sheet 1

INVENTOR.
ANTHONY B. MACHADO
BY

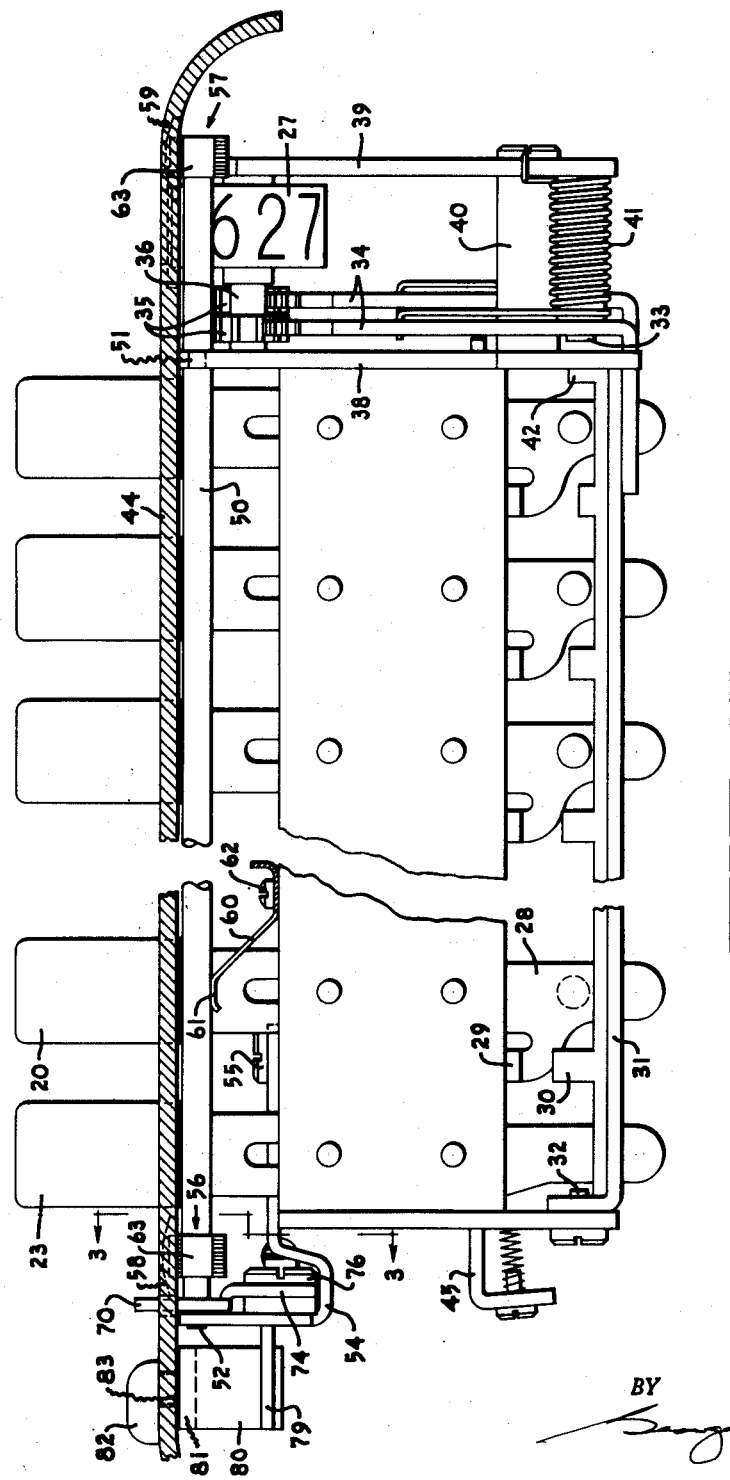

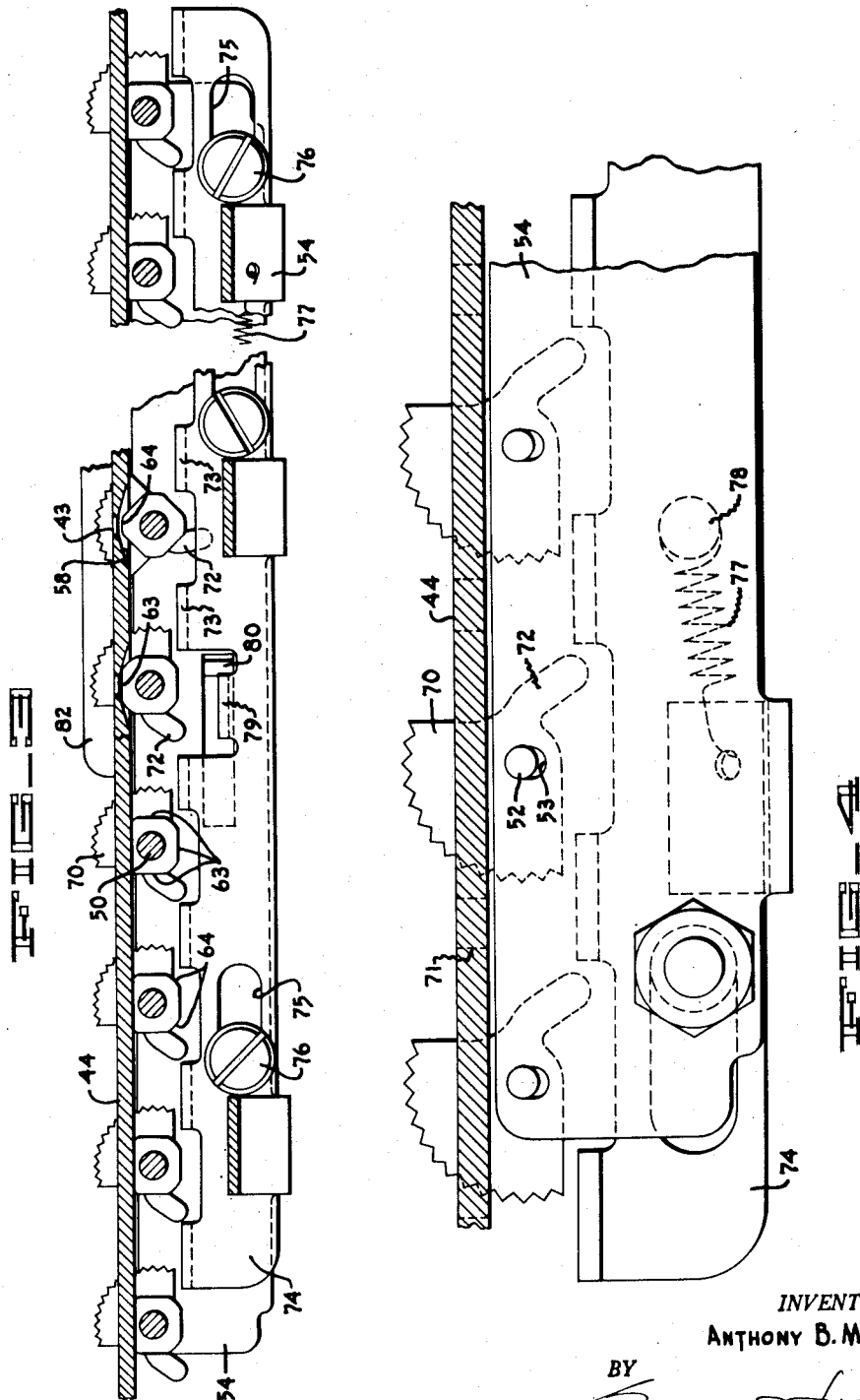

Patented Oct. 28, 1952

2,615,632

UNITED STATES PATENT OFFICE 2,615,632

DECIMAL POINT INDICATOR FOR CALCULATING MACHINES

Anthony B. Machado, San Leandro, Calif., assignor to Friden Calculating Machine Co., Inc., a corporation of California Application March 15, 1949, Serial No. 81,495

8 Claims. (Cl. 235—145)

This invention relates to calculating machines and, more particularly, to a decimal point indicator for such machines.

In calculating machines of the full keyboard type, having a plurality of rows of depressible amount keys, it is generally desirable to provide some means of distinguishing the keys to the left of the decimal point from the keys to the right thereof and also for marking off the hundreds row of keys from the thousands row, the hundreds of thousands row from the millions row, etc. Also, in those machines which are provided with keyboard check dials, it is likewise desirable to mark off the check dials in correspondence with the pointing off of the keyboard. The present disclosure illustrates a means for so marking off the keyboard and check dials of a calculating machine, together with means for clearing or erasing the previous setting of the indicators when a new set-up is required. In the past, it has always been necessary for the operator to manually and individually restore the decimal point indicators to their non-indicating positions when a new pointing-off of the various orders of the machine is required. However, according to the present invention, a manipulated member is provided for simultaneously restoring all of the displaced indicators to their normal, or non-indicating, positions.

Hence, it is an object of the present invention to provide a novel decimal point indicator for calculating machines.

Another object of the invention is to provide a decimal point indicator which at one setting will show the location of the decimal point for both the keyboard and also the keyboard check dials.

Another object of the invention is to provide a novel means for retaining the decimal point indicators in either their indicating or their non-indicating positions.

Another object of the invention is to provide means for simultaneously returning all of the decimal point indicators from their indicating positions to their non-indicating positions.

Another object of the invention is to provide a manipulable slide which is common to, and cooperates with, each of the decimal point indicators for simultaneously returning all of the indicators from their indicating positions to their non-indicating positions.

Other objects of the invention will become apparent from the following description of one particular embodiments of the invention which is shown in the accompanying drawings, wherein:

Figure 2 is a side elevation of one of the key banks shown in Figure 1.

Figure 3 is a cross sectional view taken along the line 3—3 in Figure 2.

Figure 4 is a front view of a portion of the decimal point restoring mechanism.

General description

Figure 1:
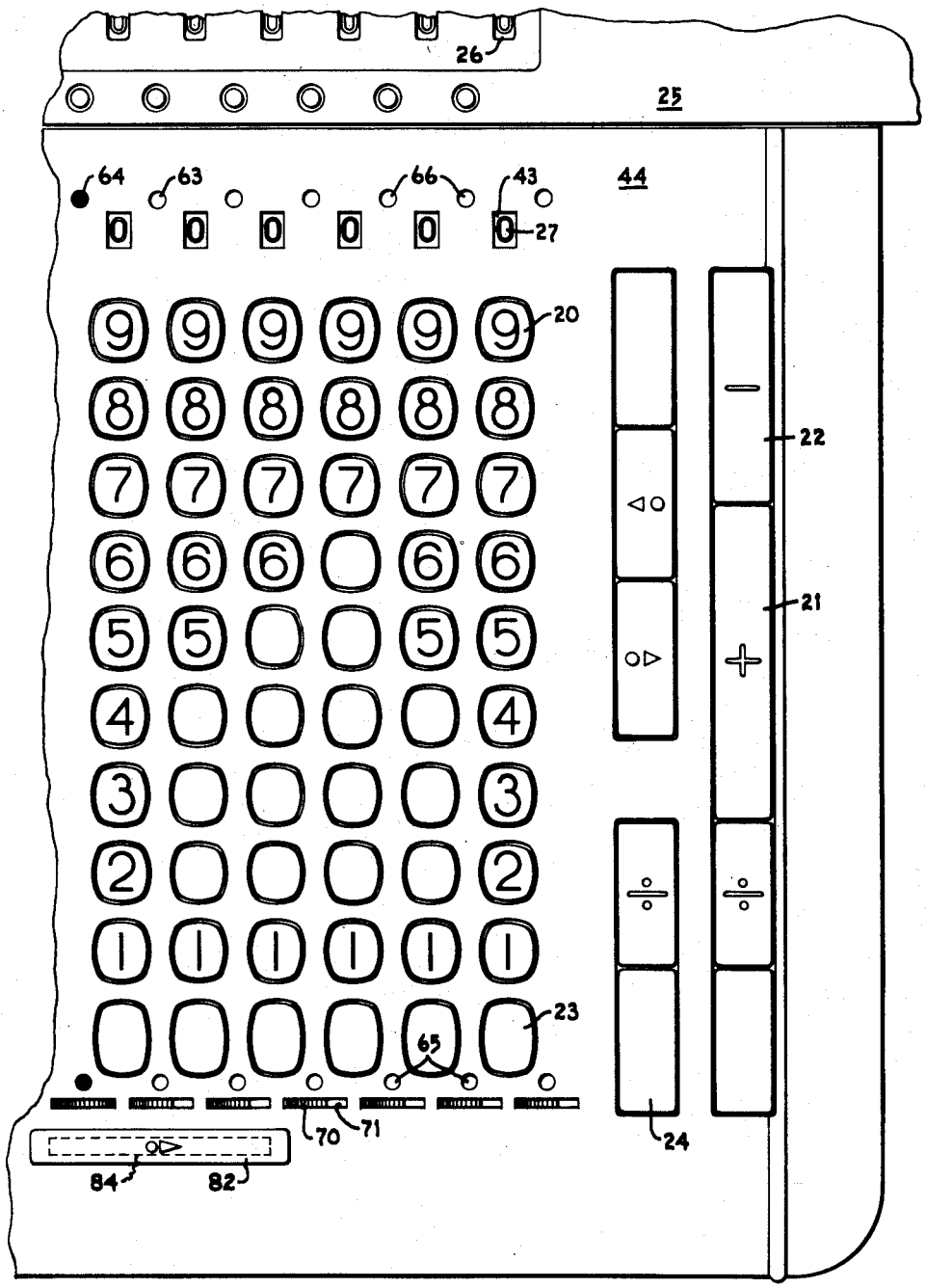
Figure 1 is a plan view of a portion of the keyboard of a calculating machine incorporating the novel decimal point indicating mechanism.

In the accompanying drawings, the present invention is shown as incorporated in a calculating machine of the type disclosed in U. S. Patent No. 2,229,889, issued to Carl M. F. Friden on January 28, 1941. As shown in Figure 1, machines of this type are provided with a plurality of ordinal rows of depressible amount keys 20, by means of which selected amounts may be entered into the accumulator of the machine by depression of the plus bar 21 or the minus bar 22. At the foot of each row of keys, there is also provided an ordinal release key 23 which, when depressed, will cause the release of any depressed amount key in its associated key bank. The machine is also provided with a keyboard clear key 24 which, when depressed, will release any and all amount keys depressed. The machine is also provided with a shiftable numeral wheel carriage 25 in which is mounted a row of revolutions counter dials 26 and also a row of accumulator dials (not shown) for accumulating amounts entered into the machine by means of the amount keys 20.

The present machine is also provided with a set of keyboard set-up indicators or check dials 27, one of which is located immediately above each row of amount keys for the purpose of indicating the value of the key depressed in its associated key bank. The check dials are operated directly from the amount keys 20 and, for this purpose, each key stem 28 (Figure 2) of the keys 20 is provided with a formed-over ear 29 which lies above a finger 30 formed on a pivoted bail 31 extending longitudinally of the machine. As shown in Figure 2, the fingers 30 are varied in length so as to cause the bail 31 to be rocked through a differential amount on its pivots 32 and 33 by the depression of various amount keys. At its rear end, each bail 31 carries a sector 34 which meshes with a pinion 35 secured to a shaft 36 on which the check dial 27 is mounted. Each shaft 36 is rotatably journalled at its forward end in the back plate 38 of the keyboard and at its rearward end in an auxiliary frame plate 39 which is supported from the plate 38 by means of suitable spacer studs 40.

The bails 31 and sectors 34 are urged in a clockwise direction, as viewed from the front of the machine, by means of torsion springs 41 so as to cause a zero stop 42, formed on each of the bails, to be brought into contact with a suitable abutment surface provided on the plate 38. Hence, when none of the amount keys 20 are depressed, the check dial 27 will be rotated to a position in which a "0" is viewable through an aperture 43 provided in the keyboard cover plate 44. However, when any one of the amount keys 20 is depressed and held in its depressed position by means of a suitable latch slide 45, the bail 31 will be rocked a differential amount and the check dial 27 rotated a corresponding amount so as to bring the appropriate numeral thereon, corresponding to the value of the key depressed, into viewing position beneath the aperture 43.

*Decimal point indicators*

For the purpose of enabling the location of the decimal point to be indicated with respect to the rows of amount keys 20 and the check dials 27, a plurality of longitudinally extending decimal point indicating bars 50 are rotatably journalled to rock in the framework of the keyboard immediately beneath the cover plate 44. As shown in Figure 2, each bar member 50 is provided, toward its rear end, with a portion of reduced diameter 51 which is received within an open-ended slot formed at the upper edge of the keyboard back plate 38. Similarly, at its forward end, each bar 50 is formed with a tenon 52 which is journalled in an elongated slot 53 provided in a transverse bracket 54 which is secured to the framework of the keyboard by means of screws 55. Thus the bars may have limited movement in the slots 53 toward and from the cover plate 44. The bars 50 are provided at either end with polygonal, e. g. octagonal-shaped indicator members or parts 56 and 57, which members are pressed upwardly into engagement with the surface of concave recesses 58 and 59, respectively, by means of a leaf spring 60 which is provided with a lip 61 bearing against the underside of its associated bar 50 and secured at its other end by means of a screw 62 to the keyboard framework. Hence, each of the bars 50 will be yieldably retained in its adjusted position by means of the frictional engagement of the elements 56 and 57 with the cover plate 44. As shown in Figures 2 and 3, the elements 56 and 57 are provided with four similar faces 63, at least one of which is provided with a color which matches that of the keyboard cover plate 44. This painted surface 63 is held against the cover plate 44 by a spring 60 when the elements 56 and 57 are in their normal positions. In a similar manner, at least one of the remaining four surfaces, herein designated by reference numeral 64, is provided with a color which is distinctively different from that provided on the cover plate 44. Thus, a counterclockwise rotation of the elements 56 and 57 (Figs. 1 and 3) from their normal positions moves a painted surface 64 to bear against the underneath side of the cover plate 44.

In order that each of the elements 56 and 57 may be viewed by the operator of the machine, the cover plate 44 is provided with a series of apertures 65 and 66 (Fig. 1) which lie immediately over the elements 56 and 57, respectively, the apertures 65 being deployed ordinally and located between each ordinal row of keys 20 near the bottom of the keyboard while the apertures 66 lie between adjacent pairs of check dials 27 near the top of the keyboard. Hence, when the bars 50 and elements 56 and 57 are positioned with their surfaces 63 located beneath the apertures 65 and 66, the color provided on the surfaces 63 will blend into the matching color of the cover plate 44 and the decimal point indicator will be located in what may be called a "non-marking" or "non-indicating" position. However, when the bars and elements are rotated counterclockwise, as viewed in Figure 3, through an arc of 45° so as to bring the surfaces 64 beneath the apertures 65 and 66, the distinguishing colors provided on the surfaces 64 will be viewable through the apertures provided in the cover plate and the decimal point indicator will then be in a "marking" or "indicating" position.

The bars 50 may be manually rotated from a marking position to a non-marking position, or vice versa, by means of setting devices comprising knurled sectors 70 which are mounted on the forward ends of the bars and project through suitable slots 71 provided in the keyboard cover plate 44. Hence, by means of the manually operable, ordinally aligned sectors 70, each indicator bar 50 may be selectively adjusted to either its "marking" or its "non-marking" position, whereby the rows of amount keys and their associated check dials may be pointed off in the manner required by the particular numbers involved in the problem being set up on the calculating machine.

*Decimal point indicator restoring mechanism*

Inasmuch as it is generally desirable to restore all of the decimal point indicators to their "non-marking" positions when a different decimal point set-up is required on the keyboard of the machine, means is provided in the present instance for enabling the operator to simultaneously restore all of the bars 50 to their "non-marking" or "non-indicating" positions. As shown in Figures 3 and 4, each sector 70 is provided with a tail 72 which, as shown in Figure 3, will be moved to a substantially vertical position when its associated bar 50 is in its counterclockwise (Figure 3) or "marking" position. Lying in cooperative relationship with the tails 72 are a plurality of ears 73 formed along the upper edge of a transverse slide 74 which is supported for sliding movement on the bracket 54 by means of elongated slots 75 provided in the slide through which pass screws 76 which fasten into the bracket 54. The slide 74 is normally urged toward the left, as viewed from the front of the machine (Figure 4), by means of a spring 77 which is tensioned between a stud 78 secured to the slide 74 and a portion of the bracket 54. The slide 74 is provided with a forwardly extending finger 79 (Figures 2 and 3) which lies in front of a downwardly extending flange 80 provided on a keeper plate 81 which lies beneath the cover plate 44. The plate 81 is connected with manually manipulatable operating bar part 82 located on the upper face of the plate 44 by means of tenons 83 provided on the bar 82 which pass through an elongated slot 84 formed in the plate 44, these tenons being secured to the keeper plate 81. Hence, when the bar 82 is moved parallel to the alignment of the devices 70 toward the right, as viewed in Figure 1, the slide 74 will be moved toward the right, as viewed in Figure 4, or toward the left, as viewed in Figure 3, thereby causing the ears 73 to contact the tails 72 on the sectors 70 of any of the bars 50 which are in their "marking" positions, thereby rotating the bars clockwise, as viewed in Figure 3, so as to bring the surfaces 63 on the elements 56 and 57 into position beneath the apertures 65 and 66. The decimal point indicators will thus be simultaneously restored to their "non-marking" positions by a single movement of the bar 82 toward the right, as viewed in Figure 1. As soon as the operator releases the bar 82, it and the slide 74 will be returned toward the left by means of the spring 77.

Having thus described my invention, what I claim as new and desire to secure by Letters Patent is:

1. In a machine of the class described having a keyboard comprising a plurality of rows of depressible amount keys, and a cover plate for said keyboard, the combination of a keyboard set-up indicator located in alignment with each row of keys and lying beneath an aperture formed in said cover plate for visually indicating the numerical value of the key depressed in each row of keys, and a decimal point indicator comprising a member rotatably mounted under said cover plate and extending between each row of keys and between each pair of adjacent set-up indicators, each of said members having two indicator parts, each including two colored surfaces the first of which is of the same color as said cover plate and the second of which is of a distinctly different color, said cover plate having a pair of apertures located immediately over each of the indicator parts of said members, one of said apertures of each pair being located at the end of the associated row of keys which is removed from said keyboard indicator and the other aperture of each pair being located adjacent to said keyboard indicator thereby providing a decimal point indicating means for simultaneously marking off the rows of keys and also the keyboard indicators.

2. A machine as defined in claim 1 which includes means for enabling each of said rotatable members to be manually positioned so as to cause one or the other of the colored surfaces to be visible through said apertures.

3. A machine as defined in claim 1 which includes means for simultaneously restoring all of said members from the position in which said second colored surfaces are visible through said apertures to the position in which said first colored surface is visible therethrough.

4. A machine of the class described comprising a plurality of individually rockably settable decimal point indicators, said indicators each having a marking position and a non-marking position, a common means for simultaneously restoring all of the indicators from their marking positions to their non-marking positions, a polygonal part on each of said indicators, a fixed concave recess associated with each of said polygonal parts, and means for yieldably retaining each of said indicators in either its marking position or its non-marking position, according to the position in which it is set, said retaining means comprising spring means resiliently urging said polygonal parts into pressing contact with the respectively associated concave recesses.

5. A machine of the class described comprising a plural order amount entering means, a decimal point indicator located between each order of said amount entering means, said indicator including a rotatable member having a marking position and a non-marking position, means for manually setting each of said members to either of said positions, a single means for synchronously restoring all of said members from their marking positions to their non-marking positions, and means for resiliently retaining each of said indicators in either its marking or its non-marking position according to the position in which it is set.

6. A machine as defined in claim 5 in which the restoring means includes a single manually operable member.

7. In a machine of the class described having a keyboard comprising a plurality of ordinal rows of depressible amount keys, and a cover plate for said keyboard, a decimal point indicator comprising a plurality of apertures in said cover plate deployed ordinally with respect to said keyboard and being individually located between adjacent keyboard ordinal rows, a plurality of indicator members under said cover plate movable relatively to the respective apertures so as either to mark or to not mark a decimal point in the associated apertures, manually operable setting devices connected respectively to said members, and being disposed in line and in ordinally spaced relation above said cover plate, and being individually movable parallel to their alignment for moving the respectively associated indicator members selectively to their marking and non-marking positons, and means for simultaneously restoring to non-marking positions any indicator members standing in marking positions, said restoring means including a manually manipulatable part mounted above said cover plate adjacent said line of manually operable devices and being movable parallel to the alignment of said devices for effecting operation of said restoring means.

8. In a calculating machine having a keyboard comprising a plurality of ordinal rows of depressible amount keys, a cover plate for said mechanism, and decimal point indicating means for marking off decimal points between selected adjacent rows of keys, said indicating means comprising, for each of a plurality of pairs of adjacent rows of keys, an aperture in said cover plate, a cancave recess on the bottom face of said plate surrounding said aperture, a member mounted to rock under said cover plate and the aperture therein and to have limited movement towards and from said cover plate, a polygonal part on said member directly under said aperture, different faces of said part being of different colors so as, when respectively displayed through said aperture, to mark or not to mark a decimal point, spring means for urging said member toward said cover plate to press said polygonal part into contact with said concave recess so as yieldingly to hold said member and said polygonal part thereof with one face of said part displayed through said aperture, and means for rocking said member against the holding influence of said spring means to another setting in which another face of said part is displayed through said aperture.

ANTHONY B. MACHADO.

REFERENCES CITED

The following references are of record in the file of this patent:

UNITED STATES PATENTS

| Number | Name | Date |
|---|---|---|
| 974,937 | Wales | Nov. 8, 1910 |
| 2,059,458 | Hosack | Nov. 3, 1936 |
| 2,059,652 | Pott | Nov. 3, 1936 |
| 2,269,907 | Gustavson | Jan. 13, 1942 |
| 2,294,948 | Avery | Sept. 8, 1942 |
| 2,329,180 | Boyd | Sept. 14, 1943 |